US011153312B2

(12) United States Patent
Watanabe et al.

(10) Patent No.: US 11,153,312 B2
(45) Date of Patent: Oct. 19, 2021

(54) USER AUTHENTICATION METHOD, EVALUATION DEVICE, NON-TRANSITORY COMPUTER-READABLE STORAGE MEDIUM, AND USER AUTHENTICATION SYSTEM

(71) Applicant: Capy Japan Inc., Tokyo (JP)

(72) Inventors: Takanobu Watanabe, Tokyo (JP); Mitsuo Okada, Tokyo (JP)

(73) Assignee: Capy Japan Inc., Tokyo (JP)

( * ) Notice: Subject to any disclaimer, the term of this patent is extended or adjusted under 35 U.S.C. 154(b) by 0 days.

(21) Appl. No.: 16/208,583

(22) Filed: Dec. 4, 2018

(65) Prior Publication Data
US 2019/0116181 A1 Apr. 18, 2019

Related U.S. Application Data

(63) Continuation of application No. PCT/JP2018/017793, filed on May 8, 2018.

(30) Foreign Application Priority Data

Sep. 11, 2017 (JP) .............................. JP2017-173799

(51) Int. Cl.
*H04L 29/06* (2006.01)
*H04L 9/32* (2006.01)

(52) U.S. Cl.
CPC ........ *H04L 63/0884* (2013.01); *H04L 9/3239* (2013.01); *H04L 2463/082* (2013.01)

(58) Field of Classification Search
CPC ............... H04L 63/0884; H04L 9/3239; H04L 2463/082; H04L 9/32; H04L 63/12;
(Continued)

(56) References Cited

U.S. PATENT DOCUMENTS

| 5,436,972 A | 7/1995 | Fischer |
| 6,141,423 A | 10/2000 | Fischer |

(Continued)

FOREIGN PATENT DOCUMENTS

| JP | H08171535 | 7/1996 |
| JP | 2009175984 | 8/2009 |

(Continued)

OTHER PUBLICATIONS

Yagi et al., "Consideration of Security Improvement for Password Manager System," IPSJ SIG Technical Report, Feb. 25, 2016, pp. 1-8.

(Continued)

*Primary Examiner* — Abu S Sholeman
(74) *Attorney, Agent, or Firm* — JCIPRNET (57) ABSTRACT

In an evaluation device, a receiver part receives, from an authentication device, a hash value of a user identifier for identifying a user, which is generated in a terminal unit used for the login by the user, and information indicating a login environment of the terminal unit, which is encrypted in the terminal unit. A decoding part decodes the encrypted information indicating the login environment of the terminal unit. A risk calculation part calculates an evaluation value that indicates a risk of the login being an unauthorized access based on a statistic related to a degree of similarity between the login environment of the terminal unit and a previous login environment by the user corresponding to the hash value. A transmitter part 120b transmits a comparison result between the calculated evaluation value and a predetermined threshold.

7 Claims, 7 Drawing Sheets

(58) Field of Classification Search
CPC .... G06Q 20/3829; G06Q 40/02; G06F 21/40; G06F 21/57; G06F 21/32
See application file for complete search history.

(56) References Cited

U.S. PATENT DOCUMENTS

| | | | |
|---|---|---|---|
| 6,216,229 B1 | 4/2001 | Fischer | |
| 9,305,151 B1 | 4/2016 | Dotan et al. | |
| 10,129,499 B1* | 11/2018 | Boone | H04W 12/0609 |
| 2007/0169181 A1* | 7/2007 | Roskind | G06F 21/31 726/5 |
| 2010/0046553 A1* | 2/2010 | Daigle | H04L 69/22 370/474 |
| 2011/0244798 A1* | 10/2011 | Daigle | H04L 67/12 455/41.2 |
| 2011/0314285 A1 | 12/2011 | Hirata et al. | |
| 2013/0054976 A1* | 2/2013 | Brown | G06F 21/6218 713/189 |
| 2015/0026784 A1* | 1/2015 | Kurkure | H04L 63/083 726/7 |
| 2015/0363775 A1* | 12/2015 | Li | H04L 9/321 705/71 |
| 2017/0078321 A1* | 3/2017 | Maylor | H04L 51/12 |
| 2017/0092276 A1* | 3/2017 | Sun | G10L 17/08 |
| 2017/0214679 A1* | 7/2017 | Lin | H04L 63/083 |
| 2018/0025148 A1* | 1/2018 | Jain | H04L 9/0872 713/166 |
| 2020/0358798 A1* | 11/2020 | Maylor | H04L 63/1483 |
| 2021/0160281 A1* | 5/2021 | Hallaji | G06N 20/00 |

FOREIGN PATENT DOCUMENTS

| | | |
|---|---|---|
| JP | 2010097467 | 4/2010 |
| JP | 2011215753 | 10/2011 |
| JP | 2012003648 | 1/2012 |
| JP | 2012203781 | 10/2012 |
| WO | 0111845 | 2/2001 |
| WO | 2006121854 | 11/2006 |

OTHER PUBLICATIONS

"International Search Report (Form PCT/ISA/210) of PCT/JP2018/017793," dated Jul. 17, 2018, with English translation thereof, pp. 1-7.

"Written Opinion of the International Searching Authority (Form PCT/ISA/237) of PCT/JP2018/017793," dated Jul. 17, 2018, with English translation thereof, pp. 1-9.

"Search Report of Europe Counterpart Application", dated Jun. 24, 2019, p. 1-p. 4.

"Office Action of Korea Counterpart Application", dated Apr. 22, 2020, with English translation thereof, p.1-p. 15.

* cited by examiner

| Hash value | d4492684fb8d97···64ab0856320fa77 |
|---|---|
| Processor information | bbb |
| Access region information | hhh |
| Browser information | jjj |

USER AUTHENTICATION METHOD, EVALUATION DEVICE, NON-TRANSITORY COMPUTER-READABLE STORAGE MEDIUM, AND USER AUTHENTICATION SYSTEM

CROSS-REFERENCE TO RELATED APPLICATIONS

This is a continuation of International Application No. PCT/JP2018/017793, filed on May 8, 2018, which claims the priority benefits of Japan Application No. 2017-173799, filed on Sep. 11, 2017. The entirety of each of the above-mentioned patent applications is hereby incorporated by reference herein and made a part of this specification.

BACKGROUND OF THE INVENTION

The present invention relates to a user authentication method, an evaluation device, a storage medium, and a user authentication system.

In recent years, so-called "spoofing" has become an issue where user identifications (IDs) and passwords used on the Internet are stolen and unauthorized access is made to websites by third parties.

A technique has thus been proposed that performs risk-based authentication based on website access history (see, for example, Japanese Unexamined Patent Application Publication No. 2011-215753).

Risk-based authentication is a supplementary authentication technique which is performed when it is determined that there is a risk of unauthorized access. Risk-based authentication is performed, for example, based on whether a user who is trying to login can respond with a secret password which is set on a user basis, and it can therefore be technologically implemented relatively easily. However, the determination of whether to perform risk-based authentication is oftentimes made based on a user's website access history, and a server responsible for access history management and the like is therefore needed.

Maintaining the server for supplemental authentication, such as risk-based authentication, may be a burden to website providers. On the other hand, risk-based authentication is based on access history, which is personal information, and thus, website providers may be reluctant to entrust risk-based authentication to an external institution from the perspective of personal information protection.

BRIEF SUMMARY OF THE INVENTION

Accordingly, the present invention has been made in view of the above-described problems and an object thereof is to provide a cloud-type risk-based authentication technique with consideration for personal information protection.

A first aspect of the invention is a user authentication method. The method includes: an authenticating, by an authentication device, of authenticating a login by a user; an information receiving step, by an evaluation device that evaluates a risk of the login being an unauthorized access, of receiving, via the authentication device: a hash value of a user identifier for identifying the user, the hash value being generated in a terminal unit used for the login by the user; and information that indicates a login environment of the terminal unit, the information being encrypted in the terminal unit; a calculating, by the evaluation device, of calculating an evaluation value that indicates the risk, the evaluation value being calculated based on a statistic related to a degree of similarity between the login environment of the terminal unit and a previous login environment by the user corresponding to the hash value; an evaluation notifying, by the evaluation device, of notifying the authentication device of a comparison result between the calculated evaluation value and a predetermined threshold; and an additional authenticating, by the authentication device, of performing an additional authentication on the user if the comparison result indicates that the risk of unauthorized access is high.

A second aspect of the invention is an evaluation device. The device includes: a receiver part that receives, from an authentication device that performs a login authentication of a user, a hash value of a user identifier for identifying the user, the hash value being generated in a terminal unit used for the login by the user, and information that indicates a login environment of the terminal unit, the information being encrypted in the terminal unit; a decoding part that decodes the encrypted information that indicates the login environment of the terminal unit; a risk calculation part that calculates an evaluation value that indicates a risk of the login being an unauthorized access based on a statistic related to a degree of similarity between the login environment of the terminal unit and a previous login environment by the user corresponding to the hash value; and a transmitter part that transmits, to the authentication device, a comparison result between the calculated evaluation value and a predetermined threshold.

A third aspect of the present invention is a non-transitory computer-readable storage medium storing a computer program. The program causes a computer to implement: a function that receives, from an authentication device that performs a login authentication of a user, a hash value of a user identifier for identifying the user, the hash value being generated in a terminal unit used for the login by the user, and information that indicates a login environment of the terminal unit, the information being encrypted in the terminal unit; a function that decodes the encrypted information that indicates the login environment of the terminal unit; a function that calculates an evaluation value that indicates a risk of the login being an unauthorized access based on a statistic related to a degree of similarity between the login environment of the terminal unit and a previous login environment by the user corresponding to the hash value; and a function that transmits, to the authentication device, a comparison result between the calculated evaluation value and a predetermined threshold.

A fourth aspect of the present invention is a user authentication system that includes: an authentication device that authenticates a login by a user via a terminal unit used by the user; and an evaluation device that evaluates a risk of the login being an unauthorized access. In the system, the authentication device includes: a communication part that communicates with the terminal unit and the evaluation device via a network; and an authentication part that authenticates the login by the user via the terminal unit used by the user, the evaluation device includes: a receiver part that receives, from the authentication device via the network, a hash value of a user identifier for identifying the user, the hash value being generated in the terminal unit, and information that indicates a login environment of the terminal unit, the information being encrypted in the terminal unit; a decoding part that decodes the encrypted information that indicates the login environment of the terminal unit; a risk calculation part that calculates an evaluation value that indicates the risk, the evaluation value being calculated based on a statistic related to a degree of similarity between the login environment of the terminal unit and a previous login environment by the user corresponding to the hash value; and a transmitter part that transmits, to the authentication device via the network, a comparison result between the calculated evaluation value and a predetermined threshold, and the authentication device further includes an additional authentication part that performs an additional authentication on the user when the comparison result acquired from the evaluation device indicates that the risk of unauthorized access is high.

DESCRIPTION OF THE EMBODIMENTS

Hereinafter, a line-of-sight input device, a method of a line-of-sight input, and a line-of-sight input program according to the present embodiment of the present invention as well as an aspect of embodiment of a recording medium are explained in detail based on the drawings. It should be noted that, this invention is not limited with the aspect of the embodiment.

<Summary of Embodiments>

A summary of the embodiments of the present invention will be provided below. A user authentication system according to an embodiment has: an authentication device, which is responsible for user login authentication; and an evaluation device, which evaluates the risk of a user login being an unauthorized access, which are connected to each other in a communication-enabled manner via a public network, such as the Internet or the like. The evaluation device is a so-called cloud-type server and it provides the evaluation function by SaaS (Software as a Service).

Links to scripts for risk-based authentication are pre-embedded into the websites provided by the authentication device. When a user accesses the website provided by the authentication device via a terminal unit, the terminal unit downloads the scripts from the evaluation device of the link destination. When the terminal unit executes the downloaded scripts, encrypted data of information indicating the login environment of the terminal unit (for example, browser information, information indicating the region in which the access is made, or the like), and a hash value of a user identifier for login are transmitted to the evaluation device via the authentication device. It should be noted that a known script, such as JavaScript®, may be used.

The terminal unit encrypts the information indicating the login environment of the terminal unit and generates the hash value of the user identifier by executing the scripts. A known encryption process, such as AES (Advanced Encryption Standard) and a known hash-value generation process, such as MD5 (Message Digest Algorithm 5), may be used by the terminal unit.

The evaluation device can acquire the information indicating the login environment by decoding the encrypted information indicating the login environment. On the other hand, the evaluation device acquires the hash value for the user identifier, and therefore cannot restore the original user identifier. However, if the original user identifier differs, the generated hash value also differs, and the evaluation device can therefore use the acquired hash value as if it were the "user identifier."

That is to say, the evaluation device manages the acquired information indicating the login environment as a history, for each user identifier's hash value. The evaluation device evaluates the risk of unauthorized access based on a statistic related to the degree of similarity between the acquired login environment and the previous login environment history. The evaluation device transmits the evaluation result to the authentication device. The authentication device selects whether to perform the risk-based authentication based on the evaluation result from the evaluation device.

In this way, the information communicated among the terminal unit, the authentication device, and the evaluation device via a public network is either encrypted or is a hash value of the original information, and the chance that the information will be leaked to a third party is therefore low. In addition, the evaluation device can acquire only the hash value of the user identifier and it is difficult to identify the original user identifier, and it is therefore practically impossible to connect the information indicating the login environment with an individual person.

Accordingly, the administrator of the authentication device can reduce the risk of the user's personal information being leaked to the administrator of the evaluation device, who is a third party. As a result, the user authentication system according to the embodiment can implement the cloud-type risk-based authentication technique with consideration for personal information protection.

<Process Flow of User Authentication System S>

Figure 1:
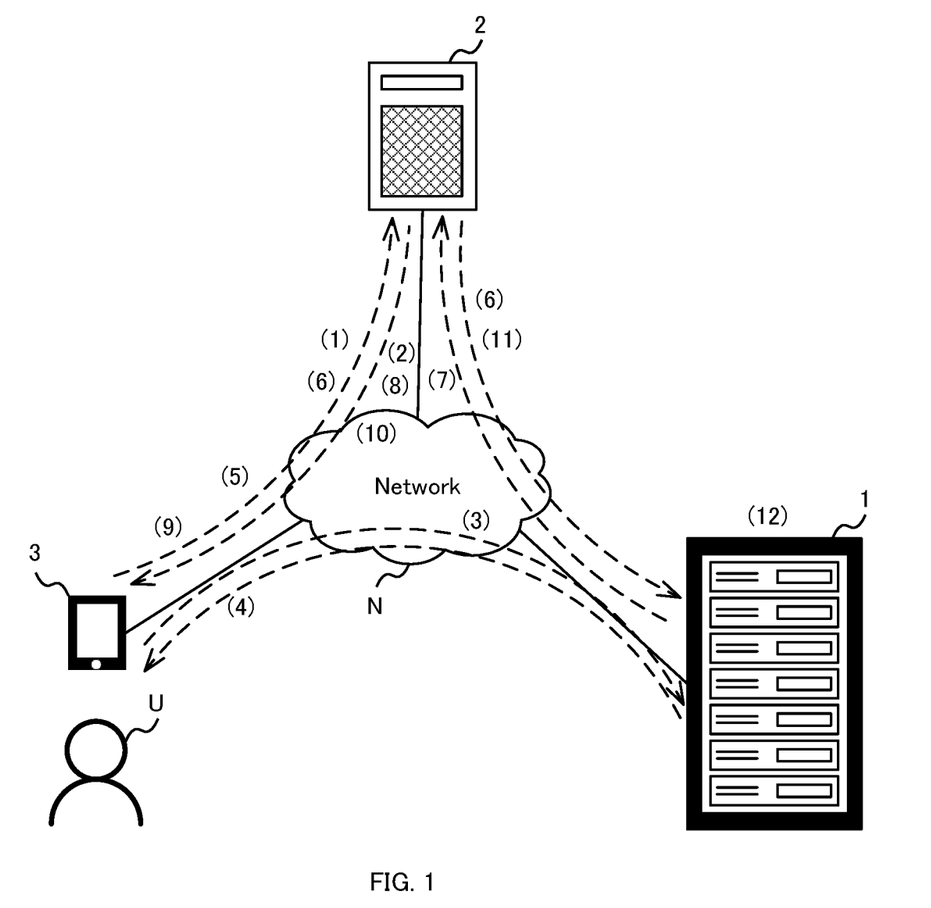
FIG. 1 is a schematic diagram for describing the summary of processes performed in a user authentication system according to an embodiment.

FIG. 1 is a schematic diagram for describing the summary of processes performed in the user authentication system S according to an embodiment. The user authentication system S according to the embodiment is provided with an evaluation device 1, an authentication device 2, and a terminal unit 3, which are connected to each other in a communication-enabled manner via a network N.

The terminal unit 3 is a terminal unit used by a user U. The authentication device 2 authenticates a login made by the user U via the terminal unit 3. The evaluation device 1 evaluates the risk of the login made by the user U being an unauthorized access. The process steps (1) to (11) performed in the user authentication system S will be described hereinafter and the descriptions thereof respectively correspond to reference numerals (1) to (11) in FIG. 1.

(1) The user U's terminal unit 3 requests a page to a website provided by the authentication device 2. In particular, the terminal unit 3 requests the page containing the risk-based authentication from the authentication device 2. The page containing the risk-based authentication includes a link to the script for the risk-based authentication. The script for the risk-based authentication is present in the evaluation device 1.

(2) The authentication device 2 transmits the page requested by the terminal unit 3 to the terminal unit 3. (3)

The terminal unit 3 requests the script from the evaluation device 1 based on the link to the script for the risk-based authentication. (4) The evaluation device 1 transmits the requested script to the terminal unit 3.

(5) The user U tries to login to the website provided by the authentication device 2 by using a user identifier and a password. (6) If the user identifier and the password match, the terminal unit 3 posts, to the authentication device 2: the encrypted data of the information indicating the login environment generated by executing the script; and the hash value of the user identifier. The authentication device 2 transmits the posted data to the evaluation device 1.

(7) The evaluation device 1 transmits, to the authentication device 2, the evaluation result of the risk of unauthorized access, which is calculated based on a statistic related to the degree of similarity between the previous login environment of the terminal unit 3 associated with the hash value of the user identifier and the acquired login environment of the terminal unit 3.

(8) If the evaluation result of the risk exceeds a predetermined threshold, the authentication device 2 performs the risk-based authentication on the user U of the terminal unit 3. (9) The user U transmits the response with respect to the risk-based authentication to the authentication device 2 via the terminal unit 3.

(10) If the user U is successful in the risk-based authentication, the authentication device 2 provides the website to the terminal unit 3. (11) If the authentication is successful, the authentication device 2 notifies the evaluation device 1 to that effect. (12) The evaluation device 1 stores the login environment of the authentication-successful terminal unit 3 in association with the hash value of the user identifier allocated to the user U of the terminal unit 3.

The operator of the authentication device 2 can implement the risk-based authentication by simply adding the link to the script for the risk-based authentication to the source code of the website to be provided to the user U. The operator of the authentication device 2 can therefore implement the risk-based authentication function without significantly modifying the existing website source code or without preparing a new server or the like.

<Functional Configurations of Evaluation Device 1 and Authentication Device 2>

Figure 2:
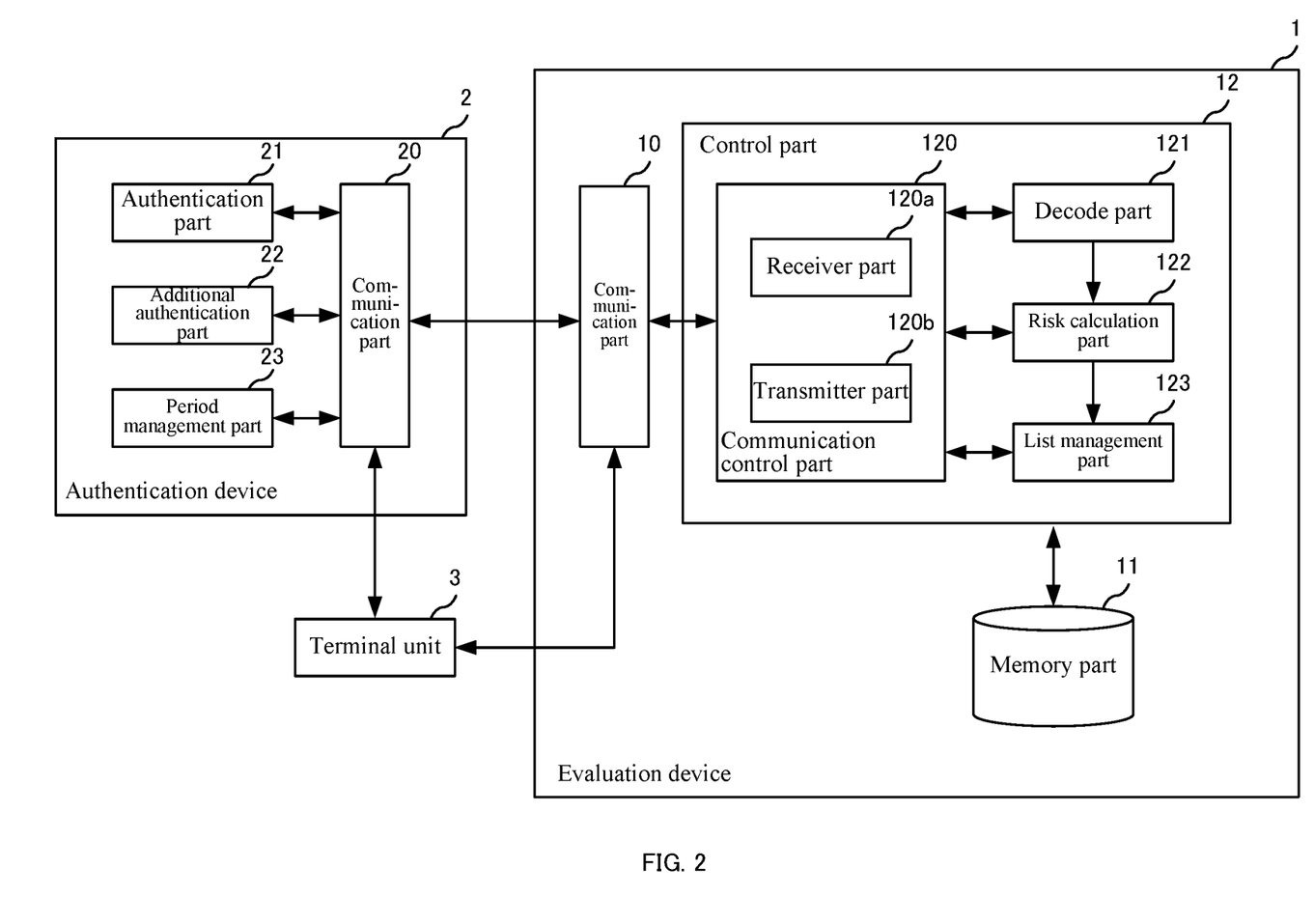
FIG. 2 is a schematic diagram showing the respective functional configurations of an evaluation device and an authentication device according to an embodiment.

The functional configuration of the evaluation device 1 and the functional configuration of the authentication device 2 will be described hereinafter with reference to FIG. 2. FIG. 2 is a schematic diagram showing the respective functional configurations of the evaluation device 1 and the authentication device 2 according to an embodiment. The evaluation device 1 is provided with a communication part 10, a memory part 11, and a control part 12. The authentication device 2 is provided with a communication part 20, an authentication part 21, an additional authentication part 22, and a period management part 23.

The communication part 10 transmits and receives data to/from the authentication device 2 and the terminal unit 3 via the network N. Examples of the memory part 11 include: a ROM (Read Only Memory) that stores a BIOS (Basic Input Output System) and the like of a computer that implements the evaluation device 1; a RAM (Random Access Memory) that serves as a working area for the evaluation device 1; and mass storage, such as an HDD (Hard Disk Drive), an SSD (Solid State Drive), and the like, that stores an OS (Operating System), an application program, and various types of information, including various databases which are referenced when executing such application programs.

The control part 12 is a processor, such as a CPU (Central Processing Unit), a GPU (Graphics Processing Unit), or the like, of the evaluation device 1 and functions as a communication control part 120, a decoding part 121, a risk calculation part 122, and a list management part 123 by executing the programs stored in the memory part 11.

The communication control part 120 is, for example, a LAN (Local Area Network) controller. The communication control part 120 functions as a receiver part 120a that receives data from a device exterior to the evaluation device 1 via the communication part 10. The communication control part 120 also functions as a transmitter part 120b that transmits data to a device external to the evaluation device 1 via the communication part 10. Based on an assumption that the communication control part 120 transmits/receives data to/from the external device via the communication part 10, the description will be given hereinafter simply such as "the receiver part 120a receives data" and "the transmitter part 120b transmits data."

Similarly to the communication part 10 of the evaluation device 1, the communication part 20 of the authentication device 2 transmits/receives data to/from the evaluation device 1 and the terminal unit 3 via the network N. The authentication part 21 authenticates the login made by the user U via the terminal unit 3. Specifically, the authentication part 21 determines that the login authentication is successful if the user identifier and the password transmitted from the terminal unit 3 match, and determines that the login authentication is failed if they do not match.

On the condition that the authentication part 21 determines that the login authentication is successful, the terminal unit 3 encrypts the information indicating the login environment and generates a hash value of the user identifier allocated to the user U of the terminal unit 3 by executing the script pre-downloaded from the evaluation device 1.

Here, the "information indicating the login environment" refers to information indicating the environment in which the terminal unit 3, which is trying to login to the website provided by the authentication device 2, is located. Specific examples of the information indicating the login environment include, without limitation, 15 items, such as the presence or absence of a cookie, CPU information, a language name, a platform name, a connecting condition, an operating system (hereinafter referred to as an "OS"), a system language name, a user agent (browser) name, a city name, a state name, a country name, an IP (Internet Protocol) address name, a name of an Internet service provider, a continent name, a screen size, and the like.

The terminal unit 3 transmits the encrypted data of the information indicating the login environment and the hash value of the user identifier to the evaluation device 1 via the authentication device 2 by posting such data to the authentication device 2. The terminal unit 3 executes the encryption processing and hash value generation on the condition that the authentication part 21 determines that the login authentication is successful. This means that, if the login authentication is failed, the terminal unit 3 will not execute the encryption processing and the hash value generation. In this way, the terminal unit 3 can be prevented from executing unnecessary processing.

The receiver part 120a of the evaluation device 1 receives the hash value of the user identifier generated in the terminal unit 3 for identifying the user U and the information indicating the login environment of the terminal unit 3 encrypted in the terminal unit 3 from the authentication device 2 via the network N. The decoding part 121 decodes the encrypted information indicating the login environment of the terminal unit 3.

The risk calculation part 122 calculates a statistic related to the degree of similarity between the login environment of the terminal unit 3 and the previous login environment logged into by the user U corresponding to the hash value. The risk calculation part 122 calculates an evaluation value that indicates the risk of the login being an unauthorized access based on the calculated statistic.

Figure 3:
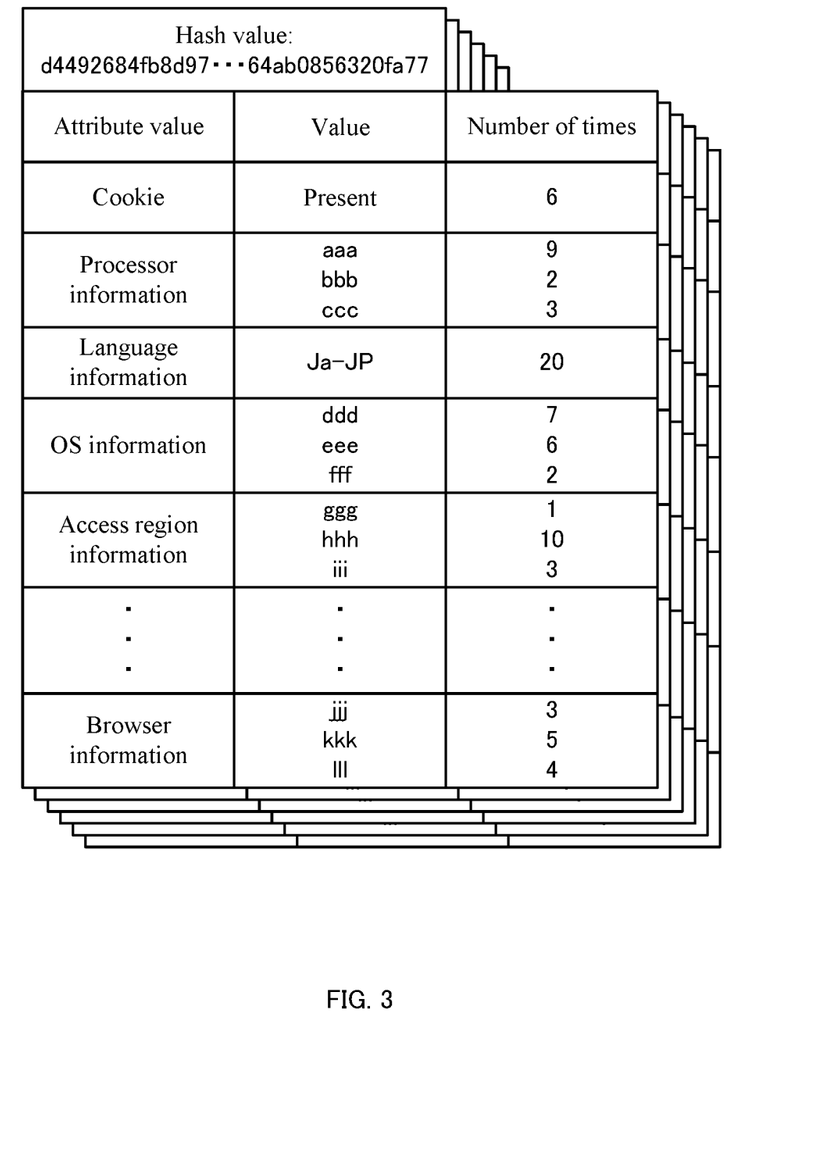
FIG. 3 is a schematic diagram showing a data structure of a login environment database, which is referenced by a risk calculation part according to an embodiment.

FIG. 3 is a schematic diagram showing a data structure of a login environment database, which is referenced by the risk calculation part 122 according to an embodiment. The login environment database is stored in the memory part 11 and is managed by the risk calculation part 122.

FIG. 3 illustrates the login environments when the user U having the user identifier hash value "d4492684fb8d97 . . . 64ab0856320fa77" logged in the past. In particular, the user U has logged in nine times in the past using the terminal unit 3 with processor "aaa." The user U has also logged in six times in the past using the terminal unit with OS "eee." It should be noted that the diagrammatic representation is omitted in FIG. 3; however, the login environment database stores previous login environments related to the above-described 15 items.

Figure 4:
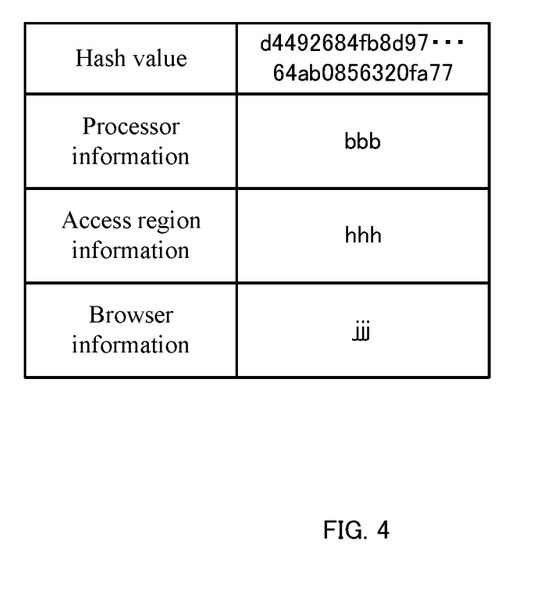
FIG. 4 is a diagram showing a login environment obtained by decoding performed by a decoding part and a hash value.

FIG. 4 is a diagram showing the login environment obtained by decoding performed by the decoding part 121 and the hash value. In the example shown in FIG. 4, the login environment of the user having the hash value "d4492684fb8d97 . . . 64ab0856320fa77" for the user identifier is shown.

The example shown in FIG. 4 shows that three items, i.e. processor information, information indicating the region in which the access is made, and browser information, are acquired as items indicating the login environment. Specifically, it is shown that the processor installed on the terminal unit 3 is "bbb" and that the terminal unit 3 has accessed the authentication device 2 using browser "jjj" from region "hhh."

The risk calculation part 122 calculates the statistic P related to the degree of similarity based, for example, on the following formulae (1) and (2):

Statistic $P=\Sigma$(the number of occurrences of an acquired item/the total number of occurrences in that item)×weight $W$ (1)

Weight $W$=the number of acquired items/the number of items contained in a login environment database (2)

Based on FIG. 3, it can be seen that the user U has logged in twice in the past from the terminal unit 3 with processor "bbb." In other words, "the number of occurrences of an acquired item" in formula (1) is "2." The user U has logged in nine times in the past from the terminal unit 3 with processor "aaa" and three times in the past from the terminal unit 3 with processor "ccc" and thus, "the total number of occurrences in that item" in formula (1) is "9+2+3=14." The same applies to the information indicating the region in which the access is made and the browser information.

The login environment acquired by decoding performed by the decoding part 121 includes three items, i.e. the processor information, the information indicating the region in which the access is made, and the browser information. On the other hand, the login environment database stores 15 items. Accordingly, based on formula (2), the weight $W=3/15$.

As described above, the risk calculation part 122 calculates the statistic $P=(2/(9+2+3)+10/(1+10+3)+3/(3+5+4))\times 3/15\approx 0.22$. As is evident from formulae (1) and (2), the statistic P calculated by the risk calculation part 122 assumes a value between 0 and 1, inclusive, and the closer the acquired login environment is to the environment of the previous logins by the terminal unit 3 and the more items indicating the login environment the risk calculation part 122 acquires, the larger the value is.

The risk calculation part 122 calculates the evaluation value that indicates the risk of the login being an unauthorized access based on the calculated statistic P. The risk calculation part 122 may provide, for example, a comparison result between the calculated statistic P and a predetermined risk determination reference threshold as the evaluation value. Alternatively, the risk calculation part 122 may determine a standard deviation or Z-score of the calculated statistic P by making reference to a statistics database (not shown) that stores previously calculated statistics P and provide a comparison result between such a value and the risk determination reference threshold as the evaluation value. In this case, the risk calculation part 122 stores the comparison result with information indicating a high risk level as "high" and the comparison result with information indicating a low risk level as "low." By doing so, the operator of the authentication device 2 can easily perform the risk evaluation determination.

In any case, it will be assumed hereinafter that the evaluation value calculated by the risk calculation part 122 indicates that the larger the value is, the lower the risk of unauthorized access is. In this case, if the evaluation value calculated by the risk calculation part 122 falls below the risk determination reference threshold, this suggests the risk of the login being an unauthorized access. It should be noted that if the risk calculation part 122 calculates the evaluation value such that the larger the evaluation value is, the larger the risk of unauthorized access is, the opposite condition applies.

Here, the "risk determination reference threshold" is a threshold set to determine the risk of the login being an unauthorized access from the evaluation value calculated by the risk calculation part 122. The specific value for this threshold can be set by having the operator of the authentication device 2 notify the evaluation device 1 of the same. In this way, the operator of the authentication device 2 can change the reference for risk determination for each website in view of the properties, and the like, of the website to be provided to the user U.

The transmitter part 120b transmits, to the authentication device, the comparison result between the evaluation value calculated by the risk calculation part 122 and the predetermined threshold. If the comparison result acquired from the evaluation device 1 indicates that the risk of the login being an unauthorized access is high, the additional authentication part 22 of the authentication device 2 performs additional authentication on the user U. The additional authentication performed by the additional authentication part 22 is so-called risk-based authentication and is authentication imposed on the user U when there is a risk of the user U's login act being an unauthorized access. A specific example case in which the risk of the login being an unauthorized access is a case in which the evaluation value is below the predetermined threshold.

The additional authentication part 22 implements the additional authentication by, for example, requiring from the user U a response to a "secret question" set for each user U. Alternatively, the additional authentication part 22 may implement the additional authentication through an "SMS authentication," which requires the input of a token transmitted to a portable terminal unit, such as a smartphone, preset by the user U, utilizing an SMS (Short Message Service). In this manner, the evaluation device 1 according to the embodiment can provide the authentication device 2 with the cloud-type risk-based authentication technique with consideration for personal information protection.

It is assumed here that the user U has changed his/her portable terminal unit for daily use. When the user U has never previously used the new portable terminal unit after the change, it is obvious that the user U has no experience in logging in to the authentication device 2 using such a portable terminal unit. Therefore, when the user U tries to log in to the authentication device 2 using such changed portable terminal unit, the risk of unauthorized access increases, even though such login is a valid access, if the determination is made solely based on the evaluation value calculated by the risk calculation part 122.

The login environment database corresponding to the user U will be updated by the user U repeating the login to the authentication device 2 with the changed portable terminal unit and thus, the evaluation value calculated by the risk calculation part 122 will gradually increase. However, if the additional authentication is imposed on the user U when logging in to the authentication device 2 until the evaluation value calculated by the risk calculation part 122 has increased, this may be cumbersome for the user U.

Accordingly, when the additional authentication of the user U is successful, the additional authentication part 22 notifies the evaluation device 1 of information indicating the success of the additional authentication. The list management part 123 of the evaluation device 1 stores, in the successful authentication list, the combination of the login environment of the terminal unit 3 at the time of successful additional authentication and the hash value of the user identifier.

Figure 5:
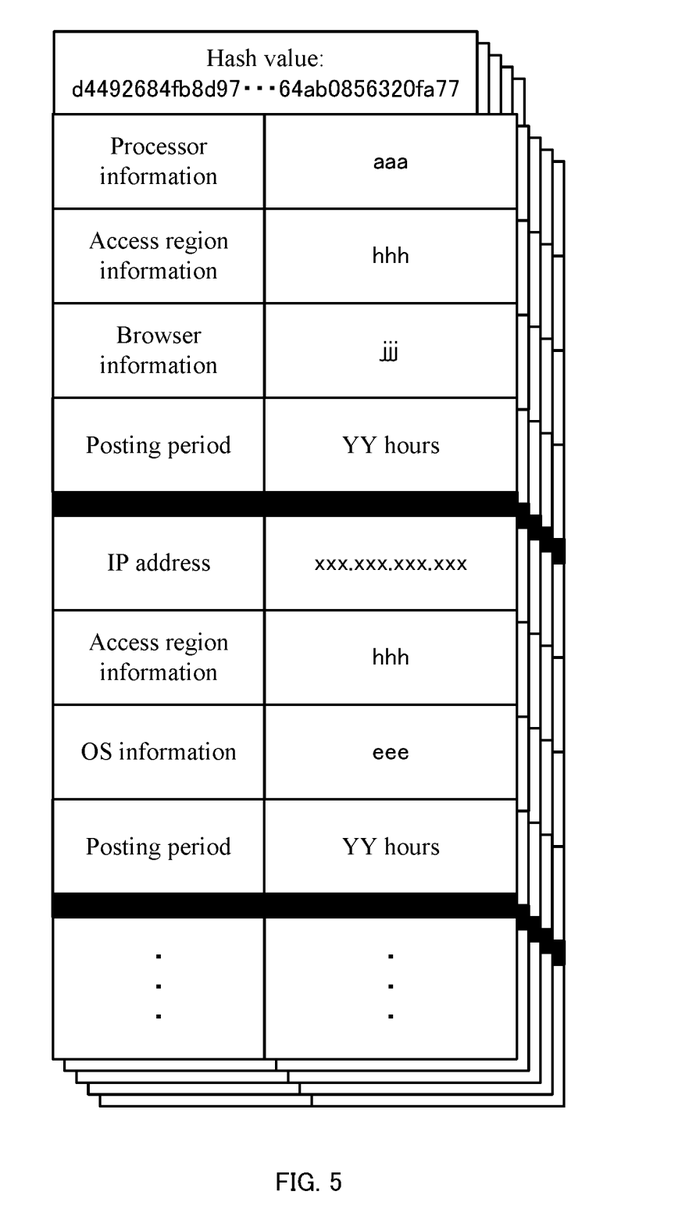
FIG. 5 is a schematic diagram showing a data structure of a successful authentication list according to an embodiment.

FIG. 5 is a schematic diagram showing a data structure of the successful authentication list according to an embodiment. The successful authentication list is stored in the memory part 11 and is managed by the list management part 123. FIG. 5 shows the successful authentication list related to the user U having the hash value "d4492684fb8d97 . . . 64ab0856320fa77" for the user identifier.

The example shown in FIG. 5 shows that the user U having the hash value "d4492684fb8d97 . . . 64ab0856320fa77" for the user identifier has logged in to the authentication device 2 from the terminal unit 3 provided with processor "aaa" using browser "jjj" from a region identified by "hhh" and that he/she has succeeded in the additional authentication. Similarly, such an example also indicates that the user U has logged in to the authentication device 2 using the terminal unit 3 with OS "eee" and having IP address "xxx.xxx.xxx.xxx" allocated thereto from the region identified by "hhh" and that he/she has succeeded in the additional authentication.

When the user U is trying to log in to the authentication device 2 in the same environment as the login environment stored in the successful authentication list, it can be considered that the probability of such a login being an unauthorized access is low. Accordingly, when the combination of the hash value and the login environment of the terminal unit acquired by the receiver part 120a is included in the successful authentication list, the risk calculation part 122 notifies the authentication device 2 of the information indicating that the login should be accepted. In this way, the additional authentication part 22 of the authentication device 2 can permit the login without imposing the additional authentication on the user U, and the usability for the user U related to logins can therefore be improved.

The risk calculation part 122 may notify the evaluation device 1 of the information indicating that the login should be accepted in place of the comparison result between the evaluation value indicating the risk of unauthorized access and the risk determination reference threshold. Accordingly, the evaluation device 1 can omit the process of calculating the evaluation value, and the risk determination as to whether the login is an unauthorized access can therefore be more quickly achieved.

As described above, if the combination of the hash value and the login environment of the terminal unit acquired by the receiver part 120a is included in the successful authentication list, the user U's login will be permitted even when the evaluation value calculated by the risk calculation part 122 suggests a risk of unauthorized access. While this improves the usability, unauthorized access may be overlooked in some situations.

The period management part 23 of the authentication device 2 therefore transmits information, to the evaluation device 1, indicating a period of time for posting the successful authentication list. The list management part 123 of the evaluation device 1 stores the posting period received from the period management part 23 in the successful authentication list. The example shown in FIG. 5 shows a posting period of XX hours for the login environment which indicates that the terminal unit 3 provided with processor "aaa" logged in to the authentication device 2 using browser "jjj" from the region identified by "hhh."

The list management part 123 removes, from the successful authentication list, the combination of the login environment of the terminal unit 3 and the hash value when the posting period of such a combination has passed after the storage in the successful authentication list. As a consequence, even if a login environment is listed in the successful authentication list, when the user U tries to login to the authentication device 2 in the same environment as such a login environment, the evaluation device 1 will not accept such a login if the posting period has already passed, and the additional authentication part 22 therefore will impose the additional authentication on the user U.

It should be noted that the posting period is set by the period management part 23 notifying the evaluation device 1 of such a posting period. The specific value of the posting period may therefore be determined by the operator of the authentication device 2 in view of the properties (such as the security strength to be set, login frequency, or the like) of the website to be provided to the user U. In this way, a balance can be achieved between improving usability for the user U regarding the login to the authentication device 2 and preventing unauthorized access to the authentication device 2 by a third party.

As can be seen, the posting period stored in the successful authentication list provides a parameter for achieving a balance between improving usability and preventing unauthorized access to the authentication device 2 by a third party. The list management part 123 may therefore adaptively change the posting period depending on the varying relationship between the evaluation value calculated by the risk calculation part 122 and the risk determination reference threshold.

Specifically, the list management part 123 extends the posting period stored in the successful authentication list such that the smaller the value, which is obtained by subtracting the evaluation value calculated by the risk calculation part 122 from the risk determination reference threshold, is, the longer the posting period is. Accordingly, even if the evaluation value calculated by the risk calculation part 122 is below the risk determination reference threshold, when the difference is small, the posting period would be longer as compared to when the difference is large.

Therefore, when the risk of unauthorized access is low, improving usability is given priority and thus, the period of time in which the authentication device 2 will not impose the additional authentication on the user U will be extended. On the contrary, when the risk of unauthorized access is high, preventing unauthorized access is given priority and the authentication device 2 will therefore impose the additional authentication on the user U at an early stage. Consequently, the authentication device 2 can achieve an appropriate balance between improving usability and preventing unauthorized access to the authentication device 2 by a third party.

<Process Flow for User Authentication Process Performed in User Authentication System S According to the Embodiment>

Figure 6:
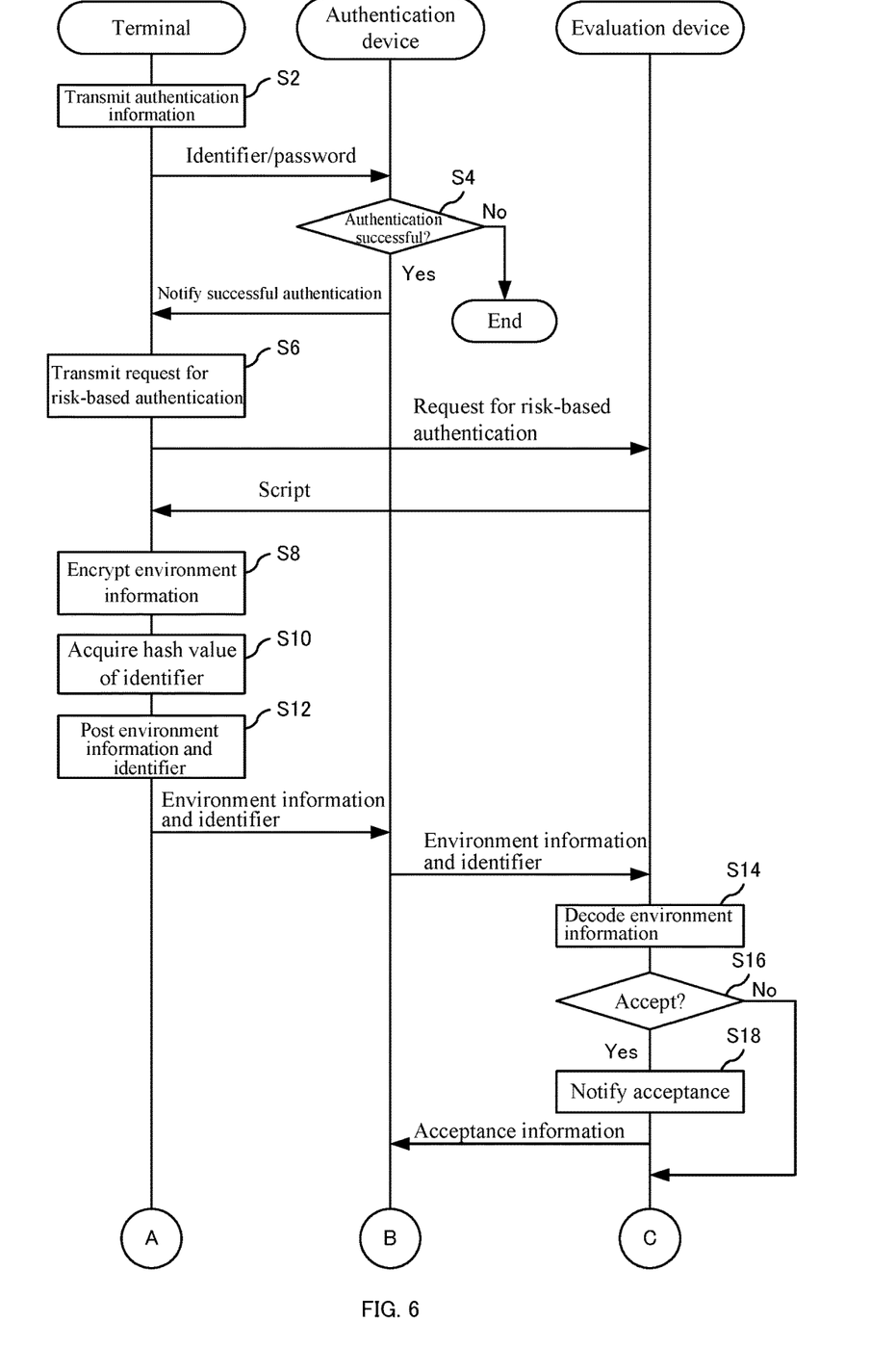
FIG. 6 is the first half of a sequence chart for describing a user authentication process performed in the user authentication system according to an embodiment.
Figure 7:
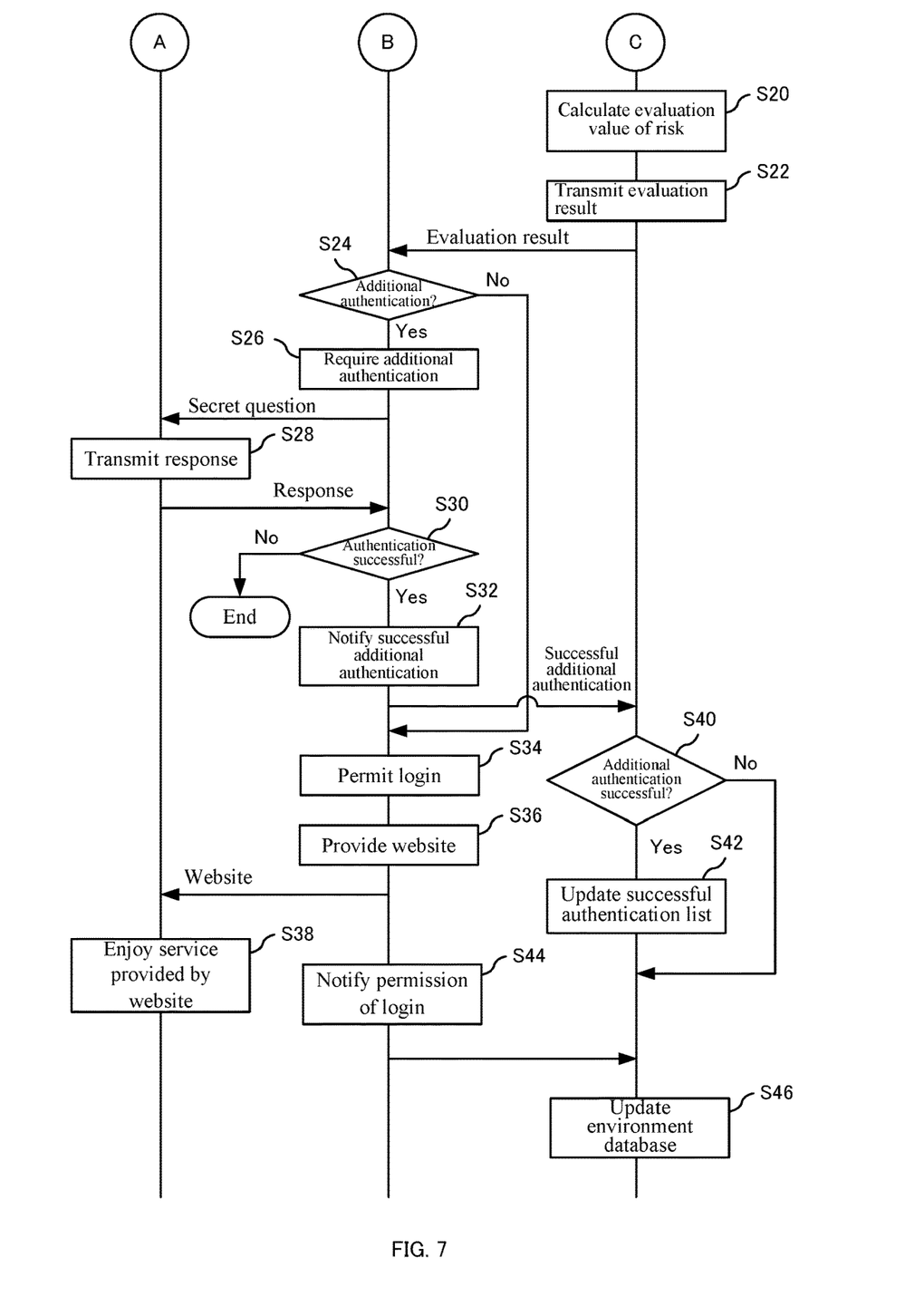
FIG. 7 is the latter half of the sequence chart for describing a user authentication process performed in the user authentication system according to an embodiment.

FIG. 6 is the first half of a sequence chart for describing the user authentication process performed in the user authentication system S according to an embodiment. FIG. 7 is the latter half of the sequence chart for describing the user authentication process performed in the user authentication system according to the embodiment. The user authentication process performed in the user authentication system S according to the embodiment will be described hereinafter with reference to FIGS. 6 and 7.

The terminal unit 3 transmits, to the authentication device 2, authentication information (i.e. a user identifier and a password) for logging in to the website provided by the authentication device 2 (S2). When the user identifier and the password do not match, in other words, when the authentication fails (S4, No), the present authentication process ends. When the authentication is successful (S4, Yes), the authentication device 2 notifies the terminal unit 3 of the success of the authentication.

The terminal unit 3 requests the risk-based authentication from the evaluation device 1 (S6). As a consequence, the terminal unit 3 acquires the script for the risk-based authentication by downloading it from the evaluation device 1. The terminal unit 3 encrypts information indicating the login environment of the terminal unit 3 by executing the script (S8).

Subsequently, the terminal unit 3 calculates and acquires a hash value of the user identifier allocated to the user U of the terminal unit 3 (S10). The terminal unit 3 posts the encrypted data of information indicating the login environment and the hash value of the user identifier to the authentication device 2 (S12). The information posted to the authentication device 2 is transferred to the evaluation device 1 via the authentication device 2.

The evaluation device 1 decodes the encrypted data of information indicating the login environment acquired from the authentication device 2 (S14). When the login environment contained in the decoded information is found in the successful authentication list, namely, when the evaluation device 1 accepts the login (S16, Yes), the evaluation device 1 notifies the authentication device 2 of information indicating the acceptance (S18). When the evaluation device 1 does not accept the login (S16, No), the evaluation device 1 does not notify the authentication device 2 of the information indicating the acceptance.

Connecting points A, B, and C in FIG. 6 show that they respectively connect to connecting points A, B and C in FIG. 7. The user authentication process performed in the user authentication system S according to the embodiment will hereinafter transition to the process shown in the sequence chart in FIG. 7.

When the evaluation device 1 does not accept the login (S16, No in FIG. 6), the evaluation device 1 calculates an evaluation value that indicates the risk of the login being an unauthorized access (S20). The evaluation device 1 transmits, to the authentication device 2, an evaluation result which is a comparison result between the calculated evaluation value and the risk determination reference threshold (S22).

When the evaluation value calculated by the evaluation device 1 is below the risk determination reference threshold, namely, when an additional authentication is to be imposed on the user U (S24, Yes), the authentication device 2 requests the additional authentication from the terminal unit 3 (S26). The user U of the terminal unit 3 inputs and transmits a response requested in the additional authentication to the authentication device 2 by way of the terminal unit 3 (S28).

When the response transmitted by the user U is incorrect, namely, when the additional authentication fails (S30, No), the authentication device 2 ends the present authentication process. When the response transmitted by the user U is correct, namely, when the additional authentication is successful (S30, Yes), the authentication device 2 notifies the evaluation device 1 of information indicating the successful additional authentication (S32). Subsequently, the authentication device 2 permits the login by the user U by means of the terminal unit 3 (S34) and provides the website to the terminal unit 3 of the user U (S36). The terminal unit 3 can therefore enjoy the service of the website provided by the authentication device 2 (S38).

When the evaluation device 1 receives, from the authentication device 2, the information indicating the successful additional authentication (S40, Yes), the evaluation device 1 updates the successful authentication list (S42). When the evaluation device 1 does not receive, from the authentication device 2, the information indicating the successful additional authentication (S40, No), the evaluation device 1 does not update the successful authentication list.

When the authentication device 2 finally permits the login of the user U, the authentication device 2 notifies the evaluation device 1 of the information indicating that the user U's login is permitted (S44). When the evaluation device 1 receives, from the authentication device 2, the information indicating that the user U's login is permitted, the evaluation device 1 updates the login environment database by associating such information with the hash value corresponding to the user identifier of the user U (S46). The user authentication system S according to the embodiment continues the user authentication process by repeating the above-described processes.

<Effect Achieved by User Authentication System S According to the Embodiment>

As described above, the cloud-type risk-based authentication technique with consideration for personal information protection can be provided according to the user authentication system S of the embodiment.

As described above, the present invention is described using the embodiments; however, the technical scope of the present invention is not limited to the scope of the description of the above-described embodiments and various modifications and changes can be made within the scope of the gist thereof. For example, specific embodiments in WI is of distribution and integration of devices are not limited to the above-described embodiments, and part or the entirety thereof may be configured in a functionally or physically distributed or integrated manner in any unit. A new embodiment obtained by combining a plurality of embodiments in an arbitrary manner is also encompassed in the embodiments of the present invention. An effect of the new embodiment obtained by such combination also has the effect of the original embodiments.

What is claimed is:

1. A user authentication method, comprising:
an authenticating, by an authentication device, of authenticating a login by using a user identifier and a password for identifying a user;
an information receiving, by an evaluation device that evaluates a risk of the login being an unauthorized access, of receiving, via the authentication device and via a public network: a hash value of the user identifier for identifying the user, the hash value being generated in a terminal unit used for the login by the user; and information that indicates a login environment of the terminal unit, the information being encrypted in the terminal unit;
a calculating, by the evaluation device, of calculating an evaluation value that indicates the risk, the evaluation value being calculated based on a statistic related to a degree of similarity between the login environment of the terminal unit and a previous login environment by the user corresponding to the hash value;
an evaluation notifying, by the evaluation device, of notifying the authentication device of a comparison result between the calculated evaluation value and a predetermined threshold;
an additional authenticating, by the authentication device, of performing an additional authentication on the user if the comparison result indicates that the risk of unauthorized access is high;
a success notifying, by the authentication device, of notifying the evaluation device of information that indicates that the additional authentication is successful if the additional authentication of the user is successful;
a success information storing, by the evaluation device, of storing, in a successful authentication list, a combination of (i) the login environment of the terminal unit when the additional authentication is successful and (ii) the hash value; and
an acceptance notifying, by the evaluation device, of notifying the authentication device of information that indicates that the login should be accepted, if a combination of the hash value and the login environment of the terminal unit acquired in the information receiving is included in the successful authentication list.

2. The user authentication method according to claim 1, further comprising:
a posting period transmitting, by the authentication device, of transmitting, to the evaluation device, information that indicates a posting period of the successful authentication list; and
a removing, by the evaluation device, of removing, from the successful authentication list, the combination of the login environment of the terminal unit and the hash value when the posting period has passed after the combination is stored in the successful authentication list.

3. The user authentication method according to claim 2, further comprising
an extending, by the evaluation device, of extending the posting period such that the smaller a value obtained by subtracting the evaluation value from the predetermined threshold is, the longer the posting period is.

4. The user authentication method according to claim 1, further comprising
an information transmitting, by the authentication device, of transmitting, to the evaluation device, the hash value and the login environment of the terminal unit, on the condition that the authentication of the login is successful.

5. An evaluation device, comprising:
a receiver part that receives via a public network, from an authentication device that performs a login authentication of a user by using a user identification and a password for identifying the user, a hash value of the user identifier, the hash value being generated in a terminal unit used for the login by the user, and information that indicates a login environment of the terminal unit, the information being encrypted in the terminal unit;
a decoding part that decodes the encrypted information that indicates the login environment of the terminal unit;
a risk calculation part that calculates an evaluation value that indicates a risk of the login being an unauthorized access based on a statistic related to a degree of similarity between the login environment of the terminal unit and a previous login environment by the user corresponding to the hash value; and
a transmitter part that transmits, to the authentication device, a comparison result between the calculated evaluation value and a predetermined threshold;
wherein the receiver part receives a notification, from the authentication device, that indicates that an additional authentication is successful, the additional authentication being performed by the authentication device if the comparison result indicates that the risk of unauthorized access is high;
the evaluation device further comprising a list management part that stores in a successful authentication list, a combination of (i) the login environment of the terminal unit when the additional authentication is successful and (ii) the hash value; and
the risk calculation part transmits, to the authentication device, information that indicates that the login should be accepted, if a combination of the hash value and the login environment of the terminal unit acquired in the information receiving is included in the successful authentication list.

6. A non-transitory computer-readable storage medium storing a computer program for making a computer perform functions of:
receiving via a public network, from an authentication device that performs a login authentication of a user by using a user identification and a password for identifying the user, a hash value of the user identifier, the hash value being generated in a terminal unit used for the login by the user, and information that indicates a login environment of the terminal unit, the information being encrypted in the terminal unit;
decoding the encrypted information that indicates the login environment of the terminal unit;
calculating an evaluation value that indicates a risk of the login being an unauthorized access based on a statistic related to a degree of similarity between the login environment of the terminal unit and a previous login environment by the user corresponding to the hash value;

transmitting, to the authentication device, a comparison result between the calculated evaluation value and a predetermined threshold;

receiving a notification, from the authentication device, that indicates that an additional authentication is successful, the additional authentication being performed by the authentication device if the comparison result indicates that the risk of unauthorized access is high, storing, in a successful authentication list, a combination of (i) the login environment of the terminal unit when the additional authentication is successful and (ii) the hash value; and transmitting to the authentication device, information that indicates that the login should be accepted, if a combination of the hash value and the login environment of the terminal unit acquired in the information receiving is included in the successful authentication list.

7. A user authentication system, comprising:

an authentication device that authenticates a login by using a user identification and a password for identifying a user via a terminal unit used by the user; and an evaluation device that evaluates a risk of the login being an unauthorized access, wherein the authentication device includes:

a communication part that communicates with the terminal unit and the evaluation device via a public network; and an authentication part that authenticates the login by the user via the terminal unit used by the user, wherein the evaluation device includes:

a receiver part that receives, from the authentication device via the network, a hash value of the user identifier for identifying the user, the hash value being generated in the terminal unit, and information that indicates a login environment of the terminal unit, the information being encrypted in the terminal unit;

a decoding part that decodes the encrypted information that indicates the login environment of the terminal unit;

a risk calculation part that calculates an evaluation value that indicates the risk, the evaluation value being calculated based on a statistic related to a degree of similarity between the login environment of the terminal unit and a previous login environment by the user corresponding to the hash value; and a transmitter part that transmits, to the authentication device via the network, a comparison result between the calculated evaluation value and a predetermined threshold, and wherein the authentication device further includes an additional authentication part that performs an additional authentication on the user when the comparison result acquired from the evaluation device indicates that the risk of unauthorized access is high;

wherein the receiver part receives a notification that indicates that the additional authentication is successful if the additional authentication of the user is successful;

the evaluation device further comprising a list management part that that stores in a successful authentication list, a combination of (i) the login environment of the terminal unit when the additional authentication is successful and (ii) the hash value; and the risk calculation part transmits, to the authentication device, information that indicates that the login should be accepted, if a combination of the hash value and the login environment of the terminal unit acquired in the information receiving is included in the successful authentication list.

* * * * *